(No Model.)
J. D. NIX.
GRAIN CONVEYER FOR HARVESTERS AND BINDERS.
No. 298,614. Patented May 13, 1884.
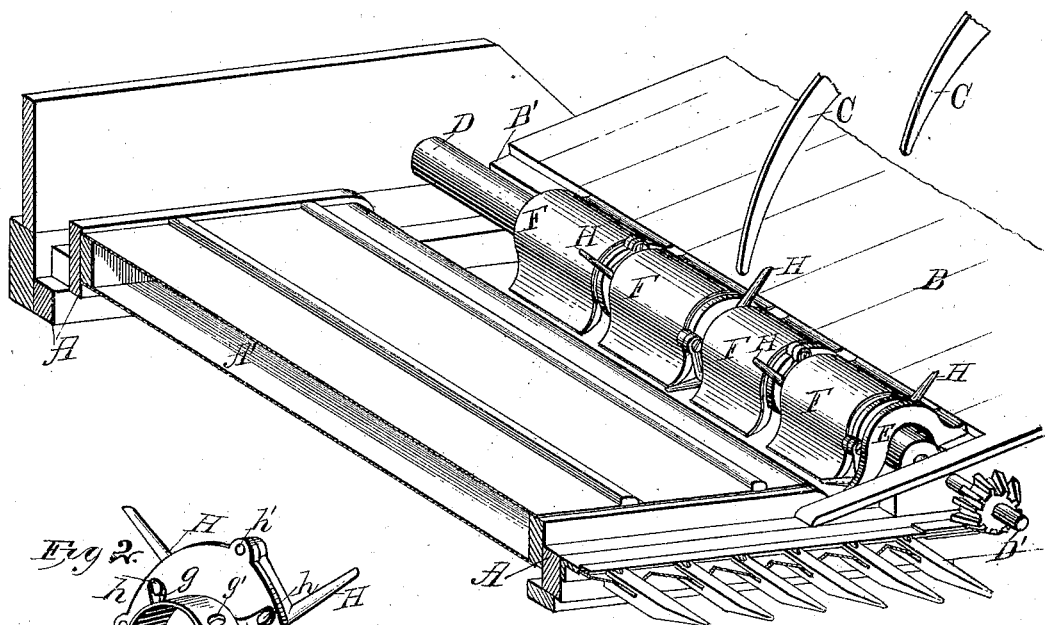
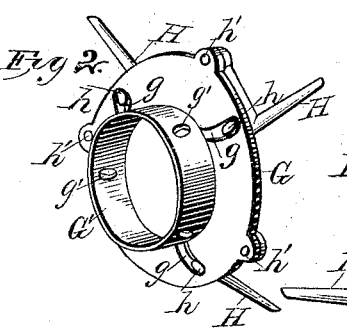
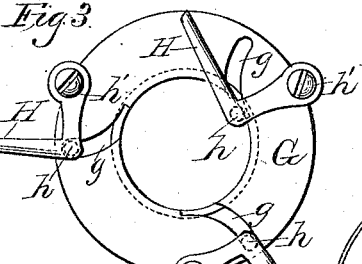
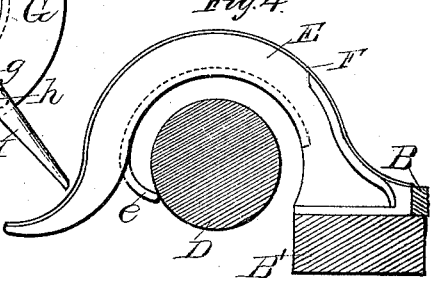
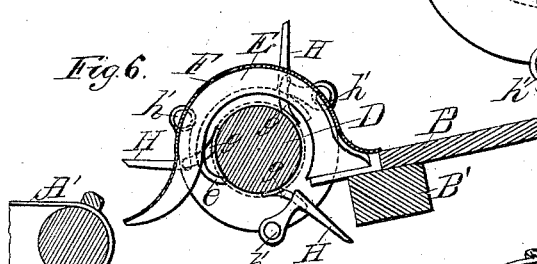
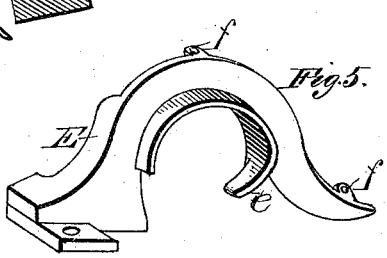
Witnesses:
E. G. Asmus
Carl Pickhardt
Inventor:
John D. Nix,
By
Stout & Underwood
Attorneys.

UNITED STATES PATENT OFFICE.

JOHN D. NIX, OF MILWAUKEE, WISCONSIN.

GRAIN-CONVEYER FOR HARVESTERS AND BINDERS.

SPECIFICATION forming part of Letters Patent No. 298,614, dated May 13, 1884.

Application filed July 24, 1882. (No model.)

*To all whom it may concern:*

Be it known that I, JOHN D. NIX, of Milwaukee, in the county of Milwaukee, and in the State of Wisconsin, have invented certain new and useful Improvements in Grain-Conveyers for Harvesters and Binders; and I do hereby declare that the following is a full, clear, and exact description thereof.

My invention relates to harvesters and grain-binders; and it consists in a conveyer of peculiar construction, whereby the passage of the grain from the apron to the binder-table is facilitated, as hereinafter set forth.

In the drawings, Figure 1 is a perspective view of a portion of a machine embodying my improvements, and Figs. 2 to 6 are details of the conveying device.

A represents the frame-work of the platform; A', the endless moving apron supported thereon, and B the stationary (though adjustable) binder-table.

C C represent the packers, and D is the shaft or roller of the conveying device, through which roller D (or connected to the ends of which) is the operating-shaft D' of the device. The binder-table B rests at its lowest edge on the beam B', to which the rear ends of the brackets E are bolted. These brackets (best shown in detail in Figs. 4 and 5) serve to support the shields F, which are bolted to them at *f f*, and certain of the said brackets are provided with cams *e*, projecting laterally from one side thereof, to guide the fingers H and keep them rigid in the operation of conveying the grain, as hereinafter described.

G G are the finger-disks or circular plates, to which are rigidly secured (by casting solidly therewith or otherwise) the flanges or collars G', which project laterally from around the central openings in said disks, which disks are also provided with the slots *g g*, (preferably three or more in number,) to receive the pins *h h*, which project from the angles of the fingers H H, which fingers are pivoted at *h' h'* to the disks G, all as best shown in Figs. 2 and 3.

In Fig. 6 I have shown the manner in which the brackets E and disks G and their attachments are arranged relatively to each other for operation. The collars G' of the disks G encircle the roller D, (which latter is preferably of wood,) and are fastened to it by suitable fastenings passing through screw-holes *g'*. These disks G are disposed at regular intervals along the roller D, and on each side of said disks are the brackets E, which are fastened to the beam B', as already described, and each pair of these brackets serves to support a shield, F, and at least every alternate bracket, E, should have the flange or cam *e*, already named, cast with or secured to it, to serve as a guide to the fingers H on the disks G.

The operation of my device is extremely simple, but very effective. The several parts being disposed in the relative positions shown in Fig. 6, certain of the fingers H (on different disks) will project horizontally toward the grain, as it is carried forward on and by the revolution of the apron A' toward the binder-table B, and as the grain reaches the end of the platform it is carried upon the lower curved portions of the shields F, between which the said fingers project, and as the roller D revolves the fingers are carried around with it, raising the grain over the shields onto the table B, within reach of the packers C. The fingers H at the time of receiving the grain from the apron are in the position shown at the left of Fig. 6. As the roller D revolves, it carries upward those fingers which have received the grain, the weight of which forces the angle of each of these said fingers back against the flanged cam *e*, and they rest against and ride rigidly upon this cam, bearing the grain up to the point shown by the top finger in Fig. 6, and then having delivered the grain over onto the binder-table B, the said uppermost fingers, having got beyond the ends of the cams *e*, next begin to fall down in the slots *g*, till the pins *h* reach the lowest points thereof, nearest the roller D, (and thus avoid clamping the grain between the ends of the fingers and the binder-table,) and next, by the continued revolution of the roller D, the said fingers, having escaped the table, begin to fall outward till their pins *h* are at the outermost points of the slots *g*, farthest from the roller D, (as shown by the lower right-hand finger in Fig. 6,) whence they are carried, as the roller D continues to revolve, again to the position shown at the left of said figure, ready to receive more grain. There being three or more of these fingers on each disk, there will always be at least one ready for the grain, while another is carrying the preceding stalks forward, and this may be further insured by fastening the disks to the roller D, so that the fingers of the several disks will not all be in line with each other, such alternate arrangement being shown in Fig. 1 of the drawings.

Having thus described my invention, what I claim as new, and desire to secure by Letters Patent, is—

1. The combination, with the cylinder D, of finger-disks G G, having flanges G', and fingers H, pivoted to said disks, having projections h, which extend into curved slots in said disks, substantially as set forth.

2. The brackets E, having cams e, the shields F, supported by said brackets, the rotating cylinder having finger-disks, and the fingers pivoted to said disks, as described, so as to be engaged by the cams and projected through the spaces between the shields, all in combination, substantially as described.

In testimony that I claim the foregoing I have hereunto set my hand, on this 24th day June, 1882, in the presence of two witnesses.

JOHN D. NIX.

Witnesses:
HAROLD G. UNDERWOOD,
CARL PICKHARDT.